United States Patent
Minagawa

(10) Patent No.: US 7,145,688 B2
(45) Date of Patent: Dec. 5, 2006

(54) STORAGE MEDIUM HOLDING PROGRAM AND INFORMATION PROCESSING APPARATUS AND INFORMATION PROCESSING METHOD

(75) Inventor: Tomonori Minagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 920 days.

(21) Appl. No.: 10/000,486

(22) Filed: Dec. 4, 2001

(65) Prior Publication Data

US 2002/0067491 A1 Jun. 6, 2002

(30) Foreign Application Priority Data

Dec. 5, 2000 (JP) ............... 2000-370346

(51) Int. Cl.
*G06F 15/00* (2006.01)
(52) U.S. Cl. ............ 358/1.2; 358/1.18; 715/764; 715/765
(58) Field of Classification Search .......... 358/1.2, 358/1.15, 1.18; 715/764–765
See application file for complete search history.

(56) References Cited

U.S. PATENT DOCUMENTS

| | | | | |
|---|---|---|---|---|
| 5,608,493 A | * | 3/1997 | Tanaka et al. | 399/83 |
| 6,149,323 A | * | 11/2000 | Shima | 400/76 |
| 6,362,892 B1 | * | 3/2002 | Lee et al. | 358/1.13 |
| 6,388,687 B1 | * | 5/2002 | Brackett et al. | 715/810 |
| 6,563,519 B1 | * | 5/2003 | Minagawa | 715/764 |
| 6,614,550 B1 | * | 9/2003 | Minagawa | 358/1.15 |
| 6,831,752 B1 | * | 12/2004 | Matsuo | 358/1.13 |
| 2005/0138573 A1 | * | 6/2005 | Mathieson | 715/809 |

OTHER PUBLICATIONS

Computer translation of Japanese Patent Document No. 2000-112683, Minagawa, Apr. 21, 2000.*
Computer translation of Japanese Patent Document No. 2000-122790, Minagawa, Apr. 28, 2000.*
Computer translation of Japanese Patent Document No. 2000-242597, Minagawa, Sep. 8, 2000.*

* cited by examiner

*Primary Examiner*—Twyler Lamb
*Assistant Examiner*—Mark R. Milia
(74) *Attorney, Agent, or Firm*—Fitzpatrick, Cella, Harper & Scinto

(57) ABSTRACT

A storage medium, an information processing apparatus and an information processing method enabling a user to perform parameter setting with high degree of freedom. To accomplish this purpose, one "preferences" is selected from a list 71 of plural "preferences" registered for plural setting items, and it is selected by using a check box 78 whether parameter of all the plural setting items are to be reflected or parameters of items other than predetermined items are to be reflected.

10 Claims, 13 Drawing Sheets

| CURRENT SETUP | | | PREFERENCES & TRANSPARENT DESIGNATION | | | FINAL SETUP | |
|---|---|---|---|---|---|---|---|
| INPUT SHEET | A4 | | INPUT SHEET | | | INPUT SHEET | A4 |
| OUTPUT SHEET | A4 | | OUTPUT SHEET | SLIP A | | OUTPUT SHEET | SLIP A |
| PRINT ORIENTATION | PORTRAIT | | PRINT ORIENTATION | | | PRINT ORIENTATION | PORTRAIT |
| NUMBER OF COPIES | 1 | | NUMBER OF COPIES | | | NUMBER OF COPIES | 1 |
| ZOOMING | 100% | + | ZOOMING | 70% | = | ZOOMING | 70% |
| RESOLUTION | 600dpi | | RESOLUTION | 600dpi | | RESOLUTION | 600dpi |
| OVERLAY | NORMAL PRINTING | | OVERLAY | OVERLAY PRINTING | | OVERLAY | OVERLAY PRINTING |
| FILE NAME | (UNTITLED) | | FILE NAME | "SLIP 1.ls4" | | FILE NAME | "SLIP 1.ls4" |
| TrueType SUBSTITUTION | ON | | TrueType SUBSTITUTION | ON | | TrueType SUBSTITUTION | ON |
| : | | | : | | | : | |

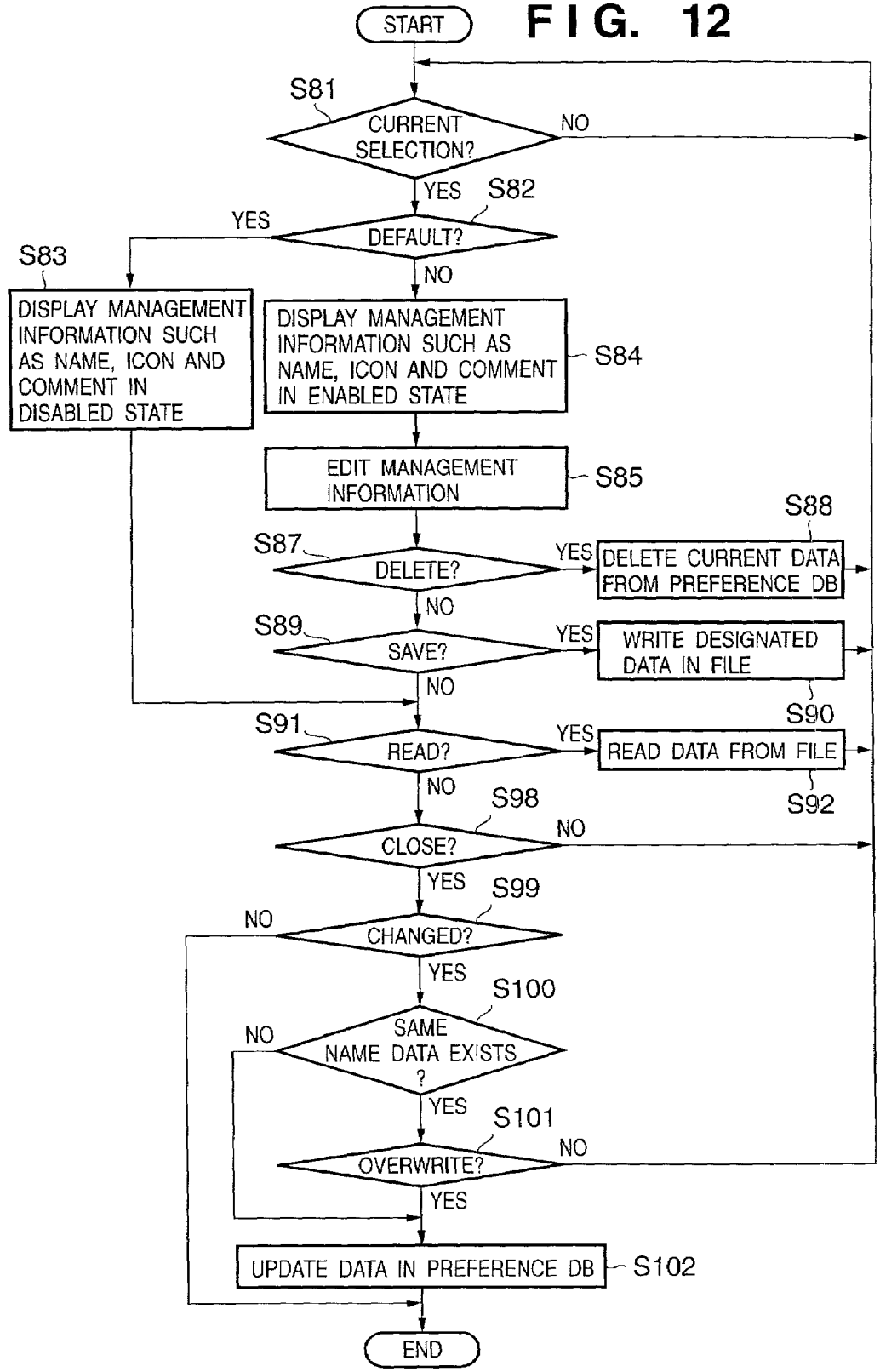

FIG. 13

STORAGE MEDIUM SUCH AS FD/CD-ROM

| DIRECTORY INFORMATION |
|---|
| FIRST DATA PROCESSING PROGRAM<br>PROGRAM CODE GROUP CORRESPONDING TO STEPS OF FLOWCHART IN FIG. 4 |
| SECOND DATA PROCESSING PROGRAM<br>PROGRAM CODE GROUP CORRESPONDING TO STEPS OF FLOWCHART IN FIG. 6 |
| THIRD DATA PROCESSING PROGRAM<br>PROGRAM CODE GROUP CORRESPONDING TO STEPS OF FLOWCHART IN FIG. 8 |
| FORTH DATA PROCESSING PROGRAM<br>PROGRAM CODE GROUP CORRESPONDING TO STEPS OF FLOWCHART IN FIG. 9 |
| (FIFTH DATA PROCESSING PROGRAM<br>PROGRAM CODE GROUP CORRESPONDING TO STEPS OF FLOWCHART IN FIG. 11) |
| (SIXTH DATA PROCESSING PROGRAM<br>PROGRAM CODE GROUP CORRESPONDING TO STEPS OF FLOWCHART IN FIG. 12) |
| BUFFER AREA FOR STORING CURRENT SETUP |
| PREFERENCE DATABASE<br>(AREA FOR REGISTERING PREFERENCES) |
| AREA FOR STORING TRANSPARENT ITEM LIST |

MEMORY MAP OF STORAGE MEDIUM

STORAGE MEDIUM HOLDING PROGRAM AND INFORMATION PROCESSING APPARATUS AND INFORMATION PROCESSING METHOD

BACKGROUND OF THE INVENTION

1. Field of the Invention

The present invention relates to a storage medium, an information processing apparatus and an information processing method relating to facilitating the control of an information processing apparatus.

2. Background of the Invention

Generally, various settings are made in a user interface (UI) of an information processing apparatus such as a personal computer. In a case where a large number of setting items are mutually dependent in a complicated manner, some interfaces provide a function to register several setting items as a group and change plural setting items in correspondence with a selected group.

As an example of a program which operates on such an information processing apparatus, there is known a printer driver in which plural parameters related to image quality such as a graphic mode, a resolution, a color setting and True Type substitution are registered in advance as a group, which is linked with an icon. When this printer driver is used, upon printing, settings of image processing can be made in correspondence with a printing purpose merely by selecting one of previously-prepared "print purpose setup" icons. Further, there is also known a printer driver having a "preferences" icon of setting items further including a sheet type and the like. If the "print purpose setup" is used, graphics related items can be efficiently changed, and if the "preferences" icon is used, all the settings related to printing can be changed at once.

However, as the number of items included in one set increases, flexibility in operation may be reduced. On the other hand, when a "preferences" icon is selected, all the parameters included there are necessarily set. For example, it is impossible to select only certain parameters from among the preferences group while continuously adopting the current settings of print sheet, paper feeding and the like. In this case, the preferences icon is selected once and thereby all the items are changed at once, and thereafter, the parameters that it was not desired to change, are restored manually to previous values. Thus, the operation is troublesome.

SUMMARY OF THE INVENTION

The present invention has been made to solve the problems in the above-described conventional art, and has its object to provide a storage medium, an information processing apparatus and an information processing method which enable a user easily to perform parameter setting with a high degree of freedom.

Accordingly, the foregoing object of the present invention is attained by providing: a storage medium holding a computer-readable program, executed by a computer, for setting for plural items, the program including: code of process for selecting a parameter group from plural parameter groups registered for plural setting items; and code of process for selecting whether parameters of all the items are to be reflected or parameters of items other than predetermined items are to be reflected, among the plural setting items.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a flowchart showing the flow of the preference editing processing according to the modification of the embodiment of FIG. 1; and FIG. 13 is a table showing a memory map of storage medium holding a data processing program and data, according to the embodiment of FIG. 1.

DETAILED DESCRIPTION OF THE PREFERRED EMBODIMENTS

Hereinbelow, the preferred embodiments of the present invention will now be described in detail in accordance with the accompanying drawings. Note that relative arrangement, expressions, numerical values and the like, unless particularly described, do not pose any limitation on the scope of the invention.

First Embodiment (Outline)

The first preferred embodiment of the present invention is a computer which executes a program for various settings such as a printer driver and a scanner driver which selects a parameter group from plural parameter groups registered for plural setting items.

When one of the registered parameter groups is selected to reflect setting values, it is selected whether values of all the items are overwritten or values of particular items among the items are overwritten with the registered values.

Items to reflect the setting values and items to be ignored are set in accordance with the following two patterns:

1. A data list of items to be overwritten (or not overwritten) is prepared in advance. Upon registration of parameter group, the respective parameters are temporarily registered for all the items, then upon selection of parameter group, the data list is referred to and only parameters of a part of the items are overwritten.

2. Upon registration of parameter group, items to be overwritten and items not to be overwritten are distinguished from each other (for example, "*" is inputted into parameter input fields of items not to be overwritten). Upon selection, the registered values are referred to and a determination is made as to whether overwriting is to be performed or not.

By the above patterns, it is possible to change only the values of those item(s) that the user wishes to change among the parameter group. This removes the inconvenience that is caused by changing values of all the items when values of some but not all items are to be changed.

(Particular Construction)

Figure 1:
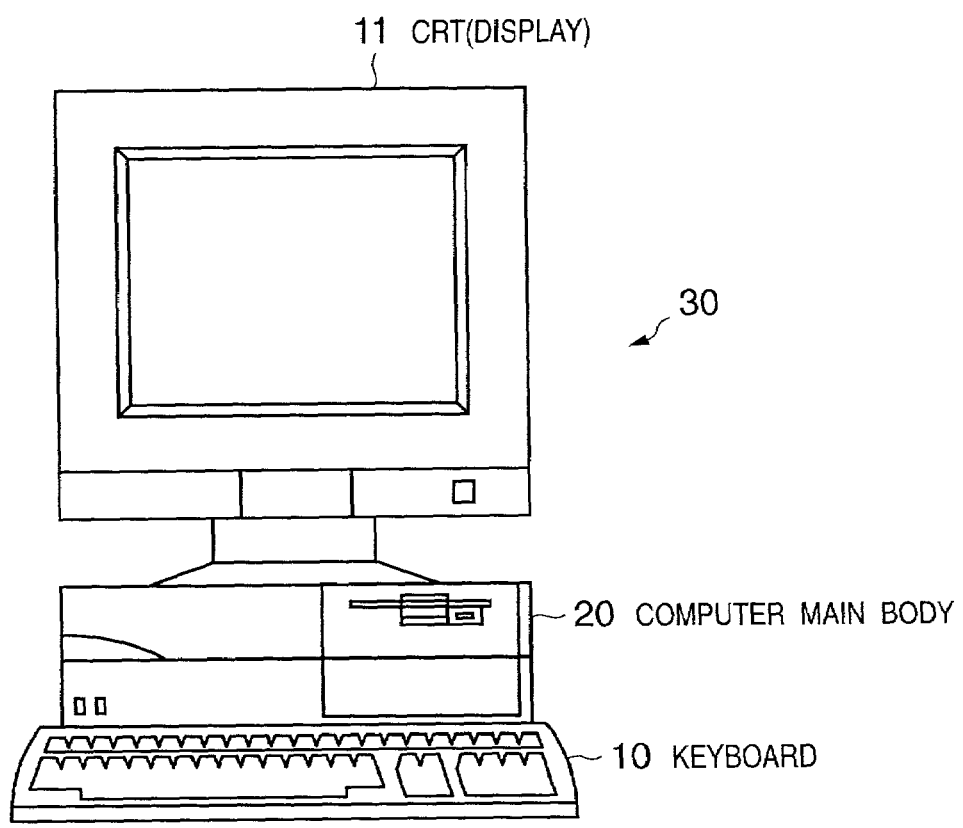
FIG. 1 is a front view of a computer system according to an embodiment of the present invention.

FIG. 1 is a front view of a so-called PC (Personal Computer) system 30 as an embodiment of information processing apparatus according to the present invention. The PC system 30 has a display 11, a computer main body (including a control board, a hard disk, a floppy disk drive and a CD-ROM drive) 20, a keyboard 10 as an input device, a pointing device (not shown) and the like.

Figure 2:
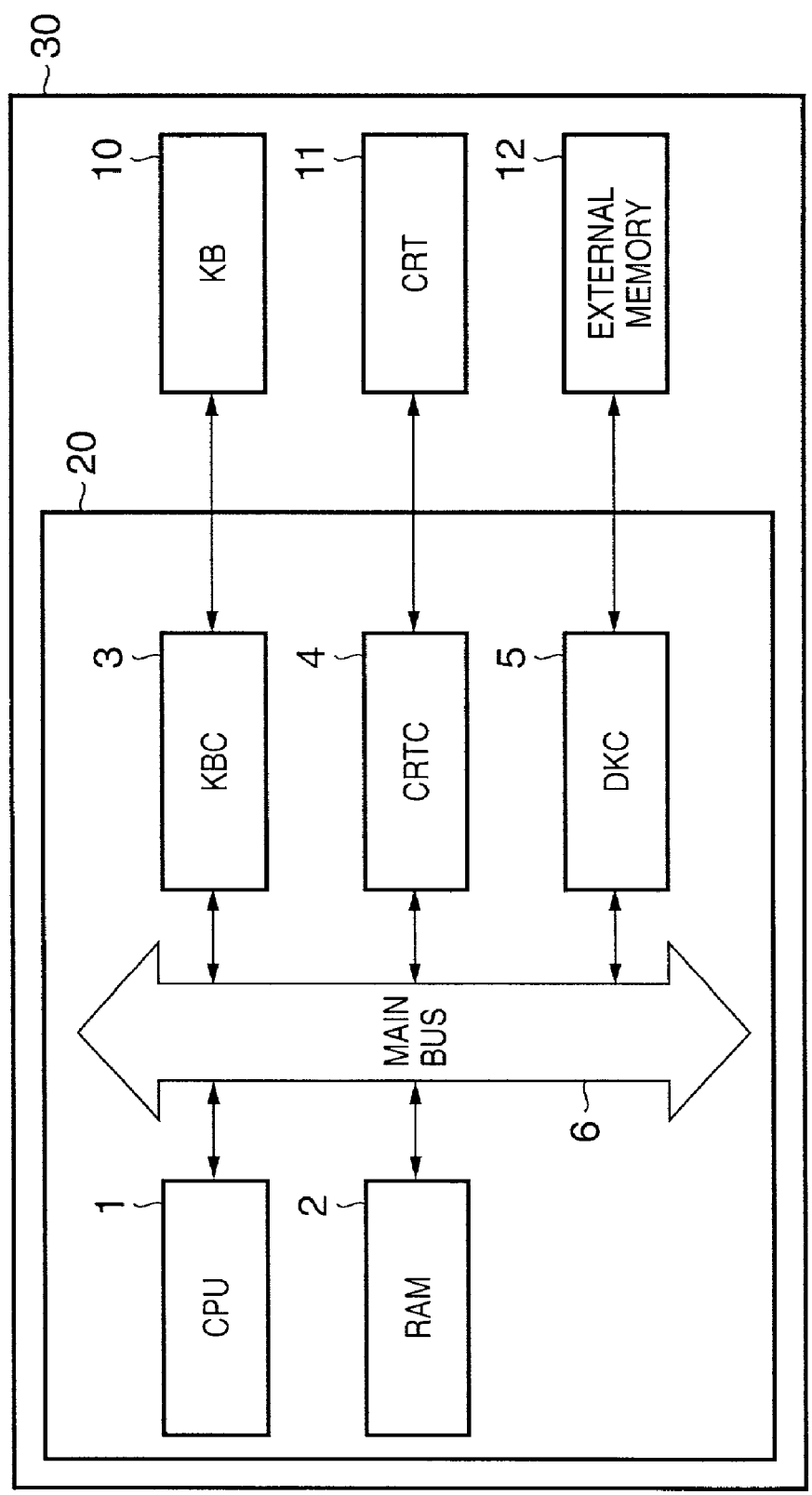
FIG. 2 is a block diagram showing the configuration of the computer system according to the embodiment of FIG. 1.

FIG. 2 is a block diagram explaining the configuration of the PC system 30 in FIG. 1.

In the computer main body 20, the CPU 1 reads various programs such as a control program, a system program and an application program, read from an external memory 12 via a disk controller (DKC) 5, on a RAM 2 to be described later, and performs various data processings. Note that the disk controller (DKC) 5 controls access to the external memory 12 such as an FD, an HD, a CD-ROM, an MD or an MO holding a boot program, various application programs, data files and the like.

The capacity of the RAM 2 can be expanded by using an optional RAM (not shown) and the like. The RAM 2 mainly functions as a work area for the CPU 1.

The keyboard controller (KBC) 3 controls key-input from the keyboard 10 and the pointing device (not shown). The CRT controller (CRTC) 4 controls display of a CRT display (CRT) 11.

The CPU 1 controls the RAM 2, the KBC 3, the CRTC 4 and the DKC 5 via a main bus 6.

In the PC system 30, if the detailed settings of application programs and device drivers are changed by using a user interface (UI), the user's input from the KB 10 or the pointing device (not shown) is received, and the status and progress of the setting change is displayed as a screen image on the CRT 11.

Next, the "preferences" will be described with reference to FIGS. 3 and 4.

Figure 3:
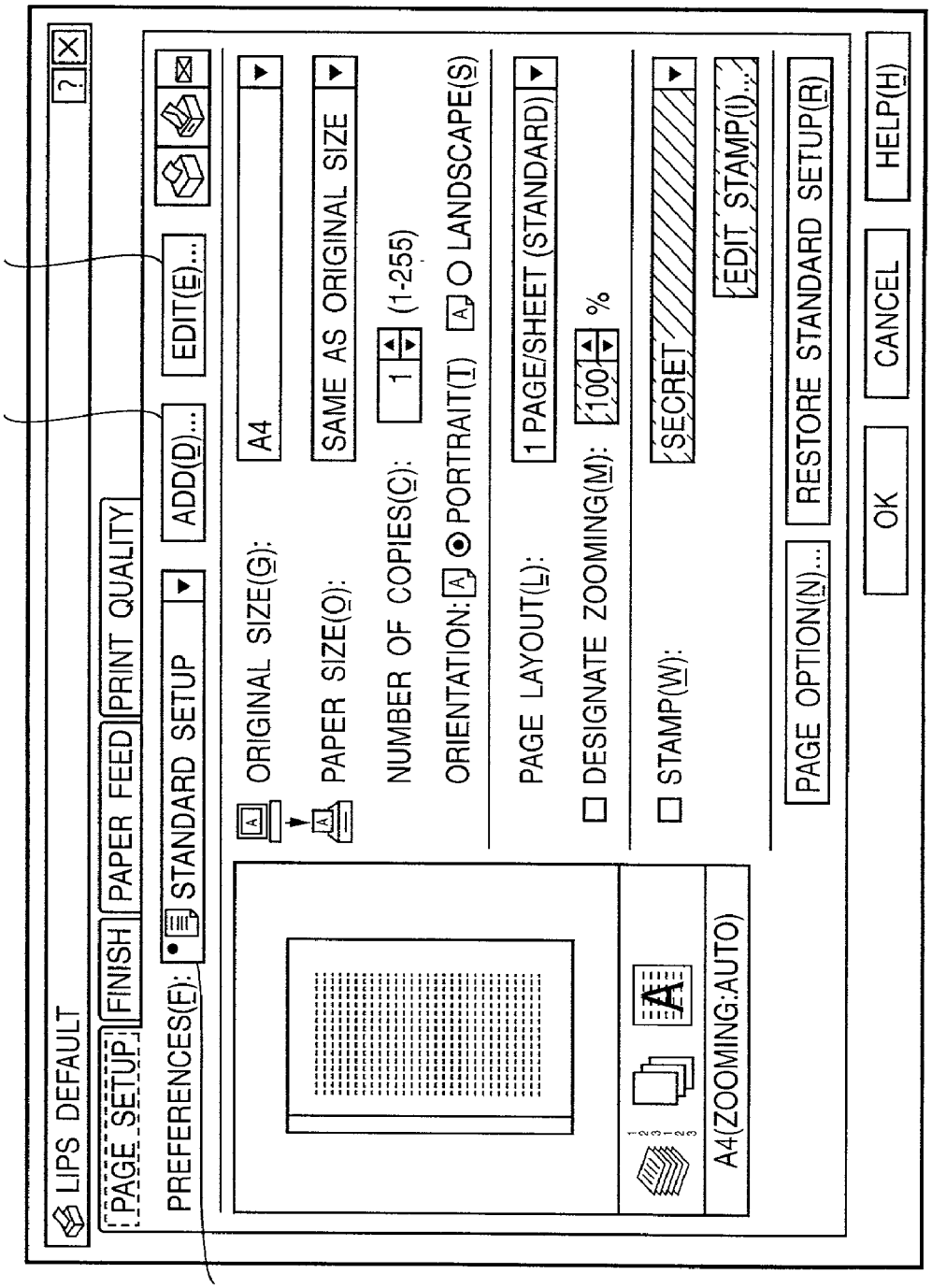
FIG. 3 is an example of dialog including control to operate preferences in the computer system according to the embodiment of FIG. 1.

FIG. 3 shows an example of dialog displayed on the CRT 11 in FIG. 2. In the dialog, plural print setups, including page setup, finishing, paper feeding, printing quality and the like, can be registered and managed as "preferences" as one complex print setup. Upon printing, if the registered set of "preferences" is selected, complicated combinations of parameters such as page setup can be immediately represented. Note that the set of "preferences" is registered in the RAM 2 or the external memory 12.

Figure 4:
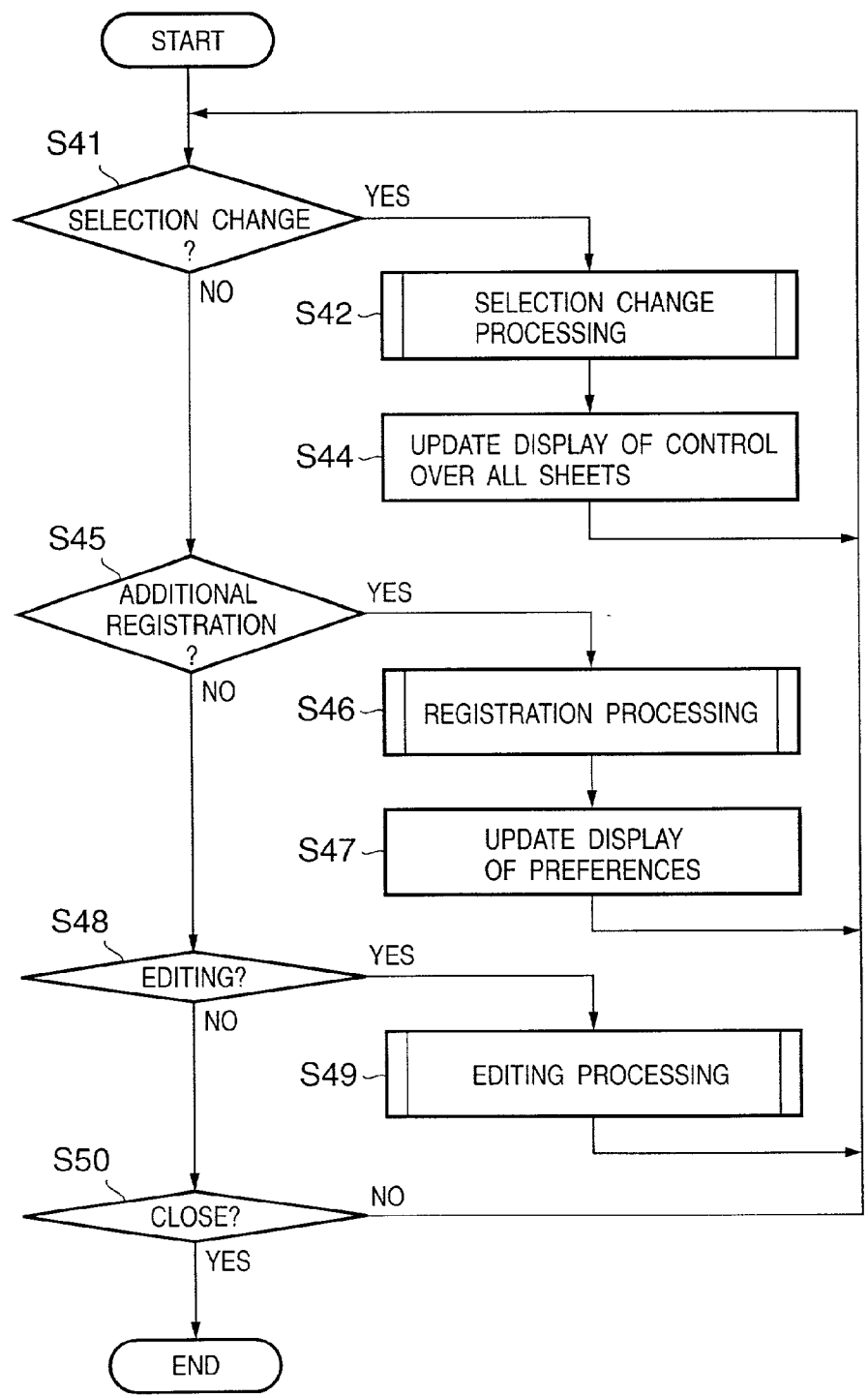
FIG. 4 is a flowchart showing the flow of management of the preferences in the computer system according to the embodiment of FIG. 1.

FIG. 4 is a flowchart showing the flow of processing related to the "preferences" using the dialog in FIG. 3.

First, if the illustrated downward arrow at the right end in the "preferences" list box 31 is clicked to change the "preferences" (step S41), a series of processings accompanying the selection change is performed (step S42), and control over all the sheets is changed in correspondence with the new setups (step S44).

Figure 5:
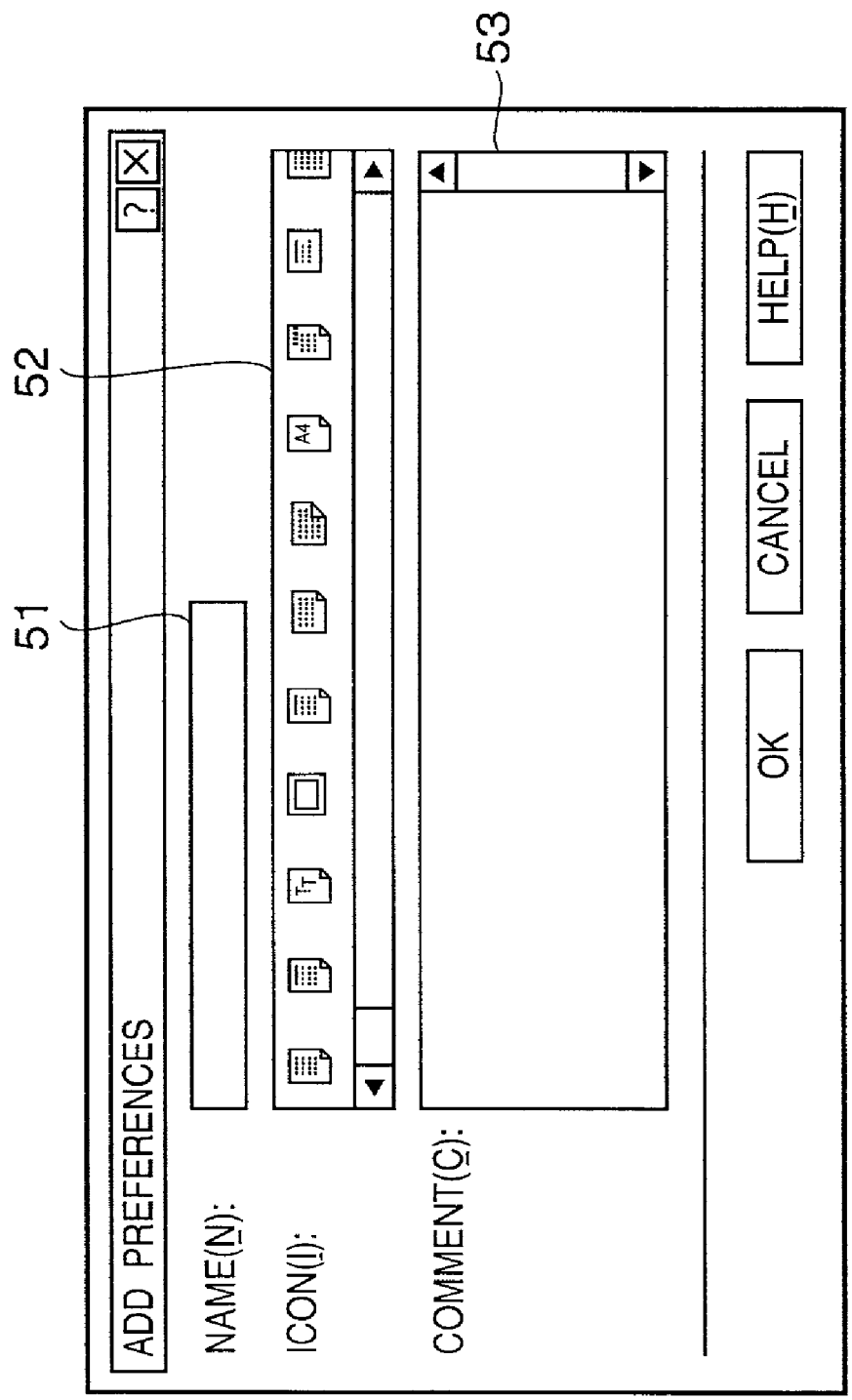
FIG. 5 is an example of dialog for registration of preferences in the computer system according to the embodiment of FIG. 1.

At step S45, it is determined whether or not an "additional registration" button 32 has been depressed. If it is determined that the "additional registration" button 32 has been depressed, the process proceeds to step S46. At step S46, a dialog as shown in FIG. 5 is displayed, and a series of processings is made for registering the current setups the as preferences. Further, at step S47, processing is performed so as to display the newly registered "preferences" in the list box 31, and the control over all the sheets is changed in correspondence with the new setups.

Figure 7:
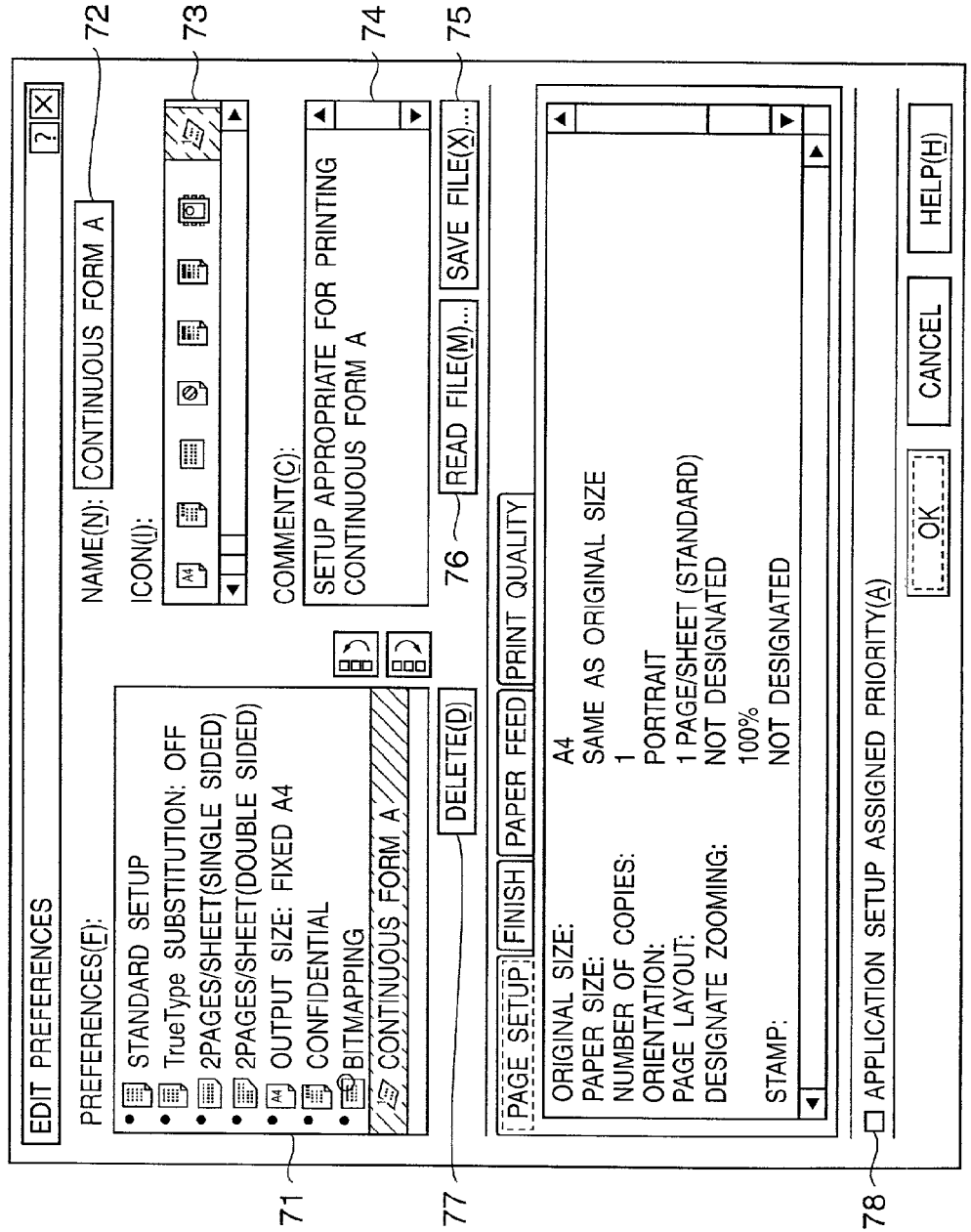
FIG. 7 is an example of dialog for preference editing in the computer system according to the embodiment of FIG. 1.

Further, if it is determined that the user has depressed an "edit" button 33, the process proceeds from step S48 to step S49, at which a dialog as shown in FIG. 7 is displayed, and a series of processings is made for editing management information.

In the dialog in FIG. 3, if "OK" or "cancel" button is clicked, it is determined at step S50 that a command to close the dialog has been received, and the print setup processing ends.

Figure 6:
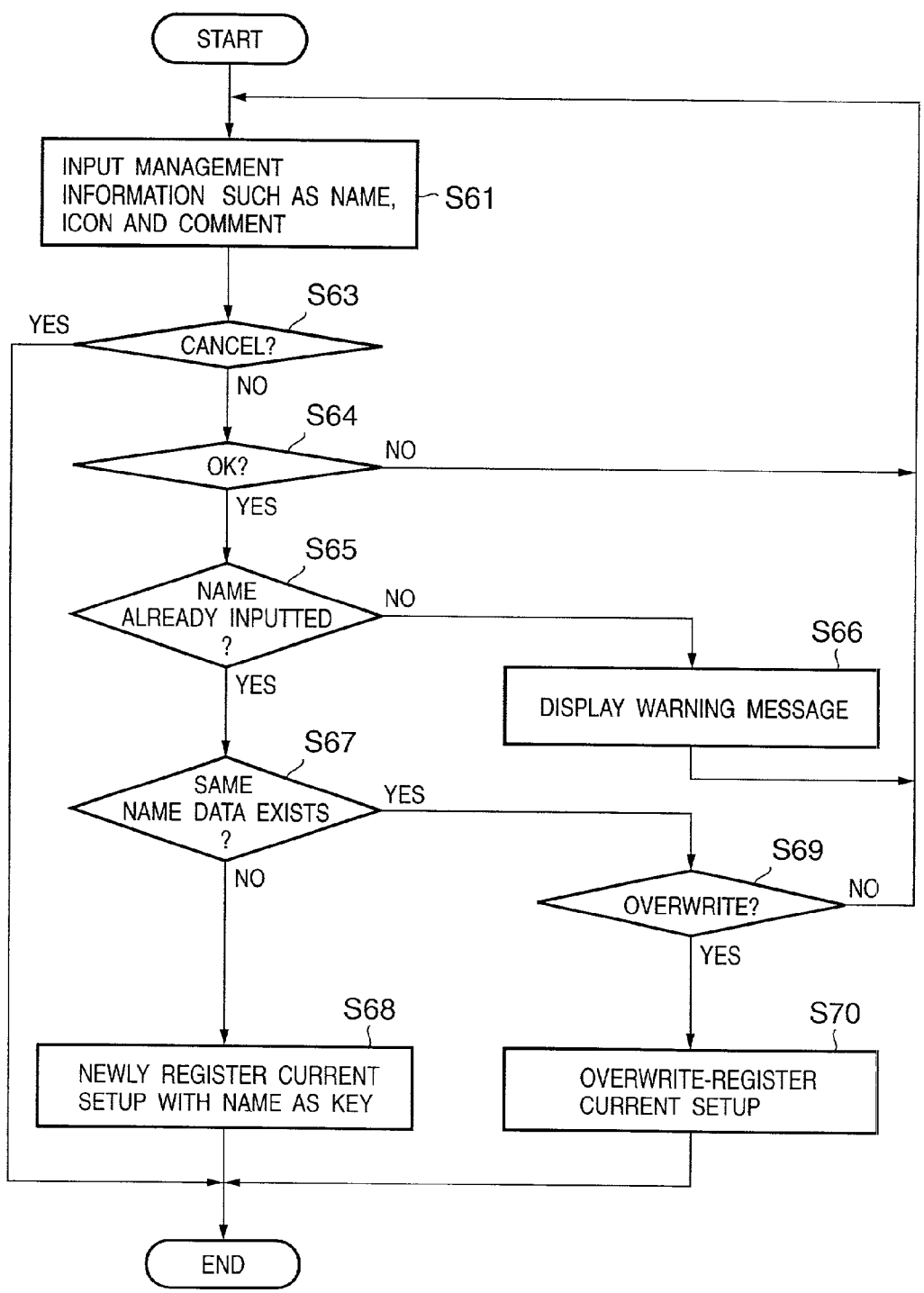
FIG. 6 is a flowchart showing the flow of preference registration processing in the computer system according to the embodiment of FIG. 1.

Next, the series of processings for registration of preferences while the dialog in FIG. 5 is displayed will be described with reference to the flowchart in FIG. 6. FIG. 5 shows an example of dialog for adding management information such as a name, an icon, a comment and the like, and this does not pose any limitation on the layout of each box.

At step S61, the user inputs management information such as a name, an icon, a comment and the like, into boxes 51, 52 and 53. At step S63, it is determined whether or not the "cancel" button has been depressed, and if it is determined that the "cancel" button has been depressed, the process ends. At step S64, it is determined whether or not the "OK" button has been depressed, and if it is determined that the "OK" button has been depressed, registration processing is started. First, at step S65, it is checked whether or not a name has been already inputted, and if it is determined that no name has been inputted, the process proceeds to step S66, at which a warning message is displayed to advise the user to input the information again. Since a name is used as a key for management of preferences, the inputting of a name is necessary.

Next, at step S67, it is checked whether or not the designated name already exists. If there is no same name, the process proceeds to step S68, at which the management information is newly registered in the preference DB with the designated name as a key. At step S67, if the same name data exists, the process proceeds to step S69, at which the user's instruction is checked as to whether or not overwriting is to be performed. If overwriting is to be performed, the process proceeds to step S70, at which the existing data in the preference DB is replaced with the designated name data and registered, while if overwriting is not to be performed, the process returns to step S61, at which the user can input the management information again. The user can input a name again. The registration is effective for all the pages to be printed in the future as well as the currently edited page. That is, the registration can be made for all the pages from any of the pages.

Figure 8:
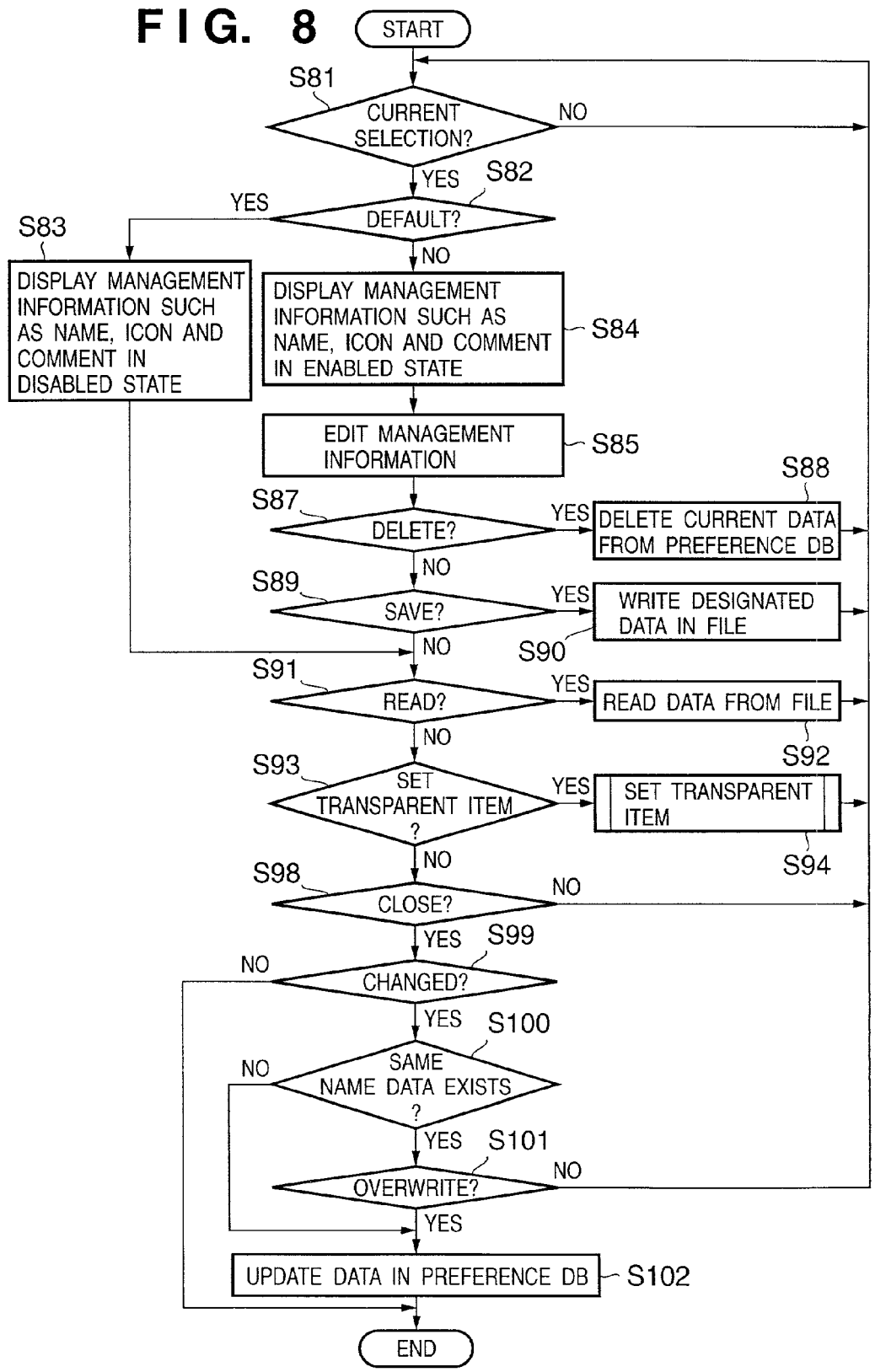
FIG. 8 is a flowchart showing the flow of preference editing processing in the computer system according to the embodiment of FIG. 1.

Next, the series of processings for editing the preferences while the dialog in FIG. 7 is displayed will be described with reference to the flowchart of FIG. 8. FIG. 7 shows an example of dialog for adding the management information such as a name, an icon, a comment and the like, and this does not pose any limitation on the layout of each box.

First, any one of already-registered preferences is selected from the preference list shown in a preference list box 71. The list provides default setups prepared from the time of purchase of the printer and user's registered setups. If any of the preferences is selected at step S81, it is determined at step S82 whether the set of preferences is the set of default setups or a set of user setups. If the preferences is the set of default setups, the process proceeds to step S83, at which management information control, a "delete" button and the like are disabled so as to disable the user's ability to edit the setups.

If the selected preferences is a set of user setups, the process proceeds to step S84, at which all types of control are enabled, and the management information (the name, the icon, the comment and the like) assigned to the preferences is displayed. Next, at step S85, editing of the management information by the user is received. If the "delete" button 77 is depressed, the process proceeds from step S87 to S88, at which the currently designated option is deleted from the preference DB. If a "save file" button 75 is depressed, the process proceeds from step S89 to step S90, at which the designated data is saved in the file so as to be exported to another client. If a "read file" button 76 is depressed, the process proceeds from step S91 to step S92, at which the preferences saved in the file is loaded, and import processing is made to add the preferences to the preference DB.

A check box 78 is an example of control UI to prevent overwriting on a particular item. In this example, when the check box is turned On, particular items such as paper size and the number of copies set in the application are assigned priority such that these items are not changed even through the set of preferences is changed (transparent designation). If the check box is turned Off, the settings in the application are ignored, and all the items of the selected preferences are set with priority.

When the dialog is closed, the process proceeds from step S98 to step S99, at which if it is determined that there is any change, the process further proceeds to step S100, at which processing to store the changed settings in the preference DB is performed. If the setting change has been made, if another setup data having the same name exists, the process proceeds from step S100 to S101, at which it is checked whether or not overwriting is to be performed. If overwriting is to be performed, the process further proceeds to step S 102, at which the existing data is overwritten with the edited data, while if overwriting is not to be performed, the user is advised to re-input data. If it is determined at step S100 that no same name data exists, the process proceeds to step S 102, at which the set of preferences with the new name is added to the preference DB.

The series of processings for selecting the preferences at step S42 in FIG. 4 will be described with reference to the flowchart of FIG. 9.

Figure 10:
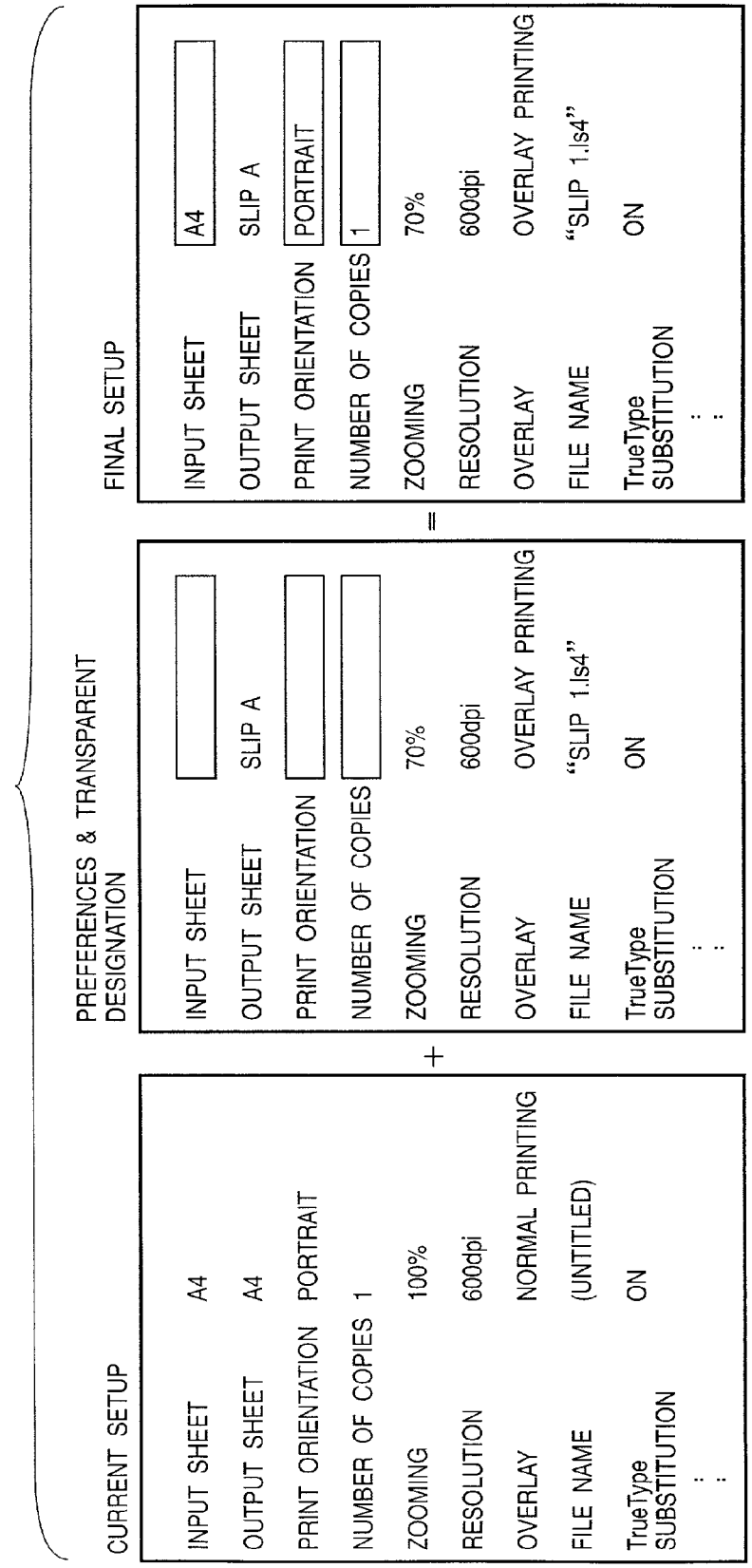
FIG. 10 is an explanatory view showing an image of partial change upon preference selection in the computer system according to the embodiment of FIG. 1.

First, the selected preferences settings are sequentially checked for all the items on the UI. At step S111, it is determined whether or not a current item is a transparent item (that is, an item of current setting which is assigned priority). At step S 12, if it is not a transparent item, the setting is overwritten with the attribute of the preferences. If it is a transparent item, the attribute of the preferences is ignored. These steps are repeated for all the items. FIG. 10 shows an illustration of this process. In that figure, transparent items and overwritten items mixedly exist. The transparent items (transparent list) can be set by the user.

In the above arrangement, upon a change of preferences, all the items set as preferences can be changed at once, or otherwise, the set of preferences can be partially changed. Thus the efficiency of user's setting can be improved.

In this manner, all the items are registered, then upon use of the set of preferences, item(s) to be changed (or item(s) not to be changed) can be appropriately set.

Note that to check whether or not an item is a transparent item, the setting of the check box 78 in FIG. 7 is utilized. If this setting is On, particular items (e.g. paper size, sheet orientation and the number of copies) are assigned priority, and the other items are overwritten with the settings of the preferences. That is, all the items are registered, and upon selection, a separately prepared transparent item list is referred to for determination of transparent items and overwritten items. Accordingly, whatever set of preferences is selected, the same item reflects the setting.

However, this is merely an example of transparent setting, but transparent setting may be made for individual items or groups. For example, various controls can be made by employing, e.g., control to individually control respective items, control for particular sheet, and control for only graphics-related items such as the conventional "print purpose setup".

Hereinbelow, a modification will be described as an example where, upon registration of preferences, items including transparent items are individually registered such that items to be reflected are changed in each set of preferences.

Figure 11:
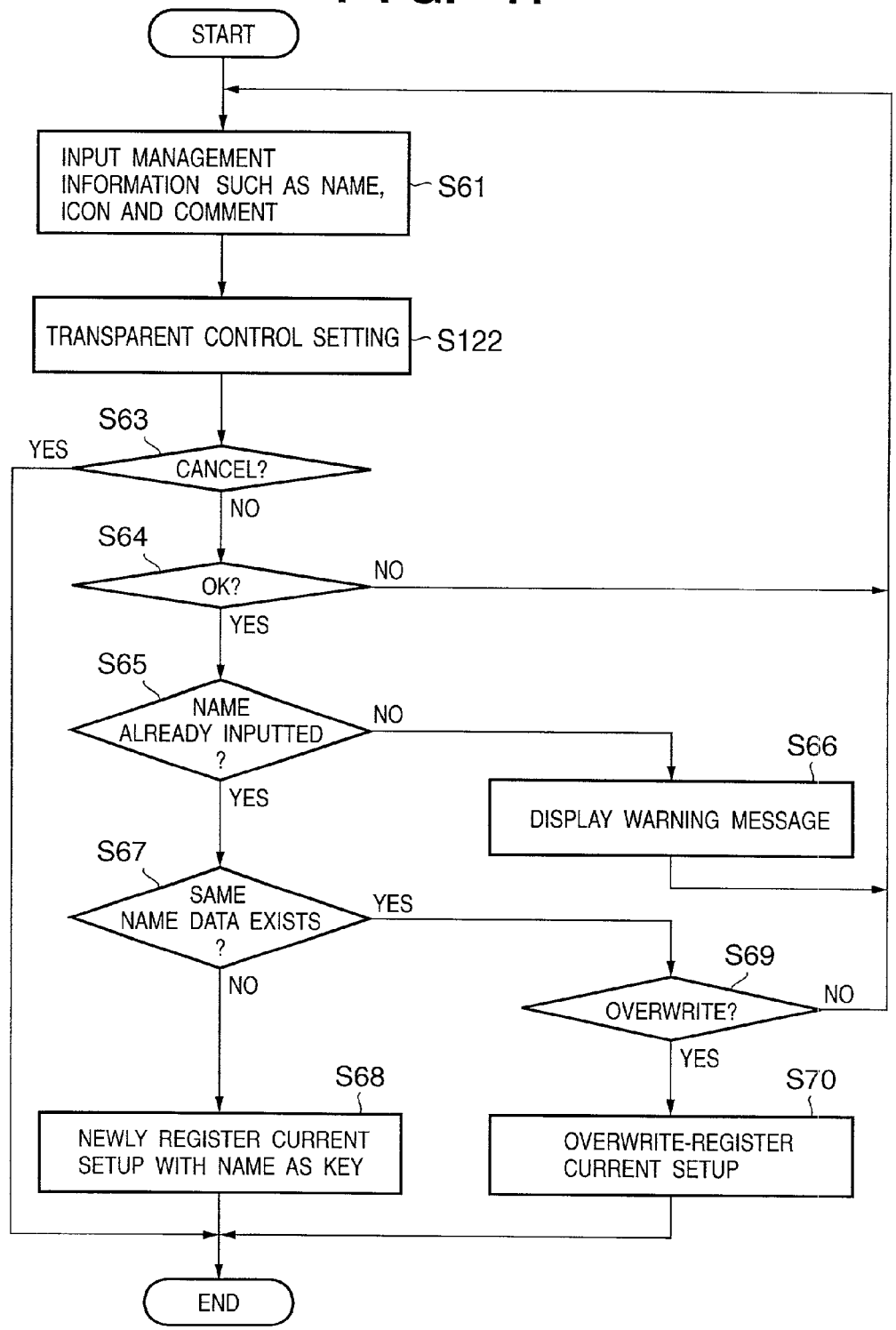
FIG. 11 is a flowchart showing the flow of the preference registration processing according to a modification of the embodiment of FIG. 1.

FIG. 11 is a flowchart showing the series of processings for registering the preferences at step S46 in the flowchart of FIG. 4 in the modification. The difference from FIG. 6 is that transparent items and overwritten items can be set at step S 122. The other processings corresponding to those in FIG. 6 have the same numerals, and explanation of those steps will be omitted.

Further, in this modification, the series of processings for editing the preferences at step S49 in the flowchart of FIG. 4 is also modified. FIG. 12 is a flowchart showing the preference editing processing in the modification. The difference from FIG. 8 is that the transparent item setting steps S93 and S94 are omitted. Since transparent items are set upon registration, the setting of transparent items at these steps is unnecessary. The other processings corresponding to those in FIG. 8 have the same numerals, and explanation of those steps will be omitted.

Figure 9:
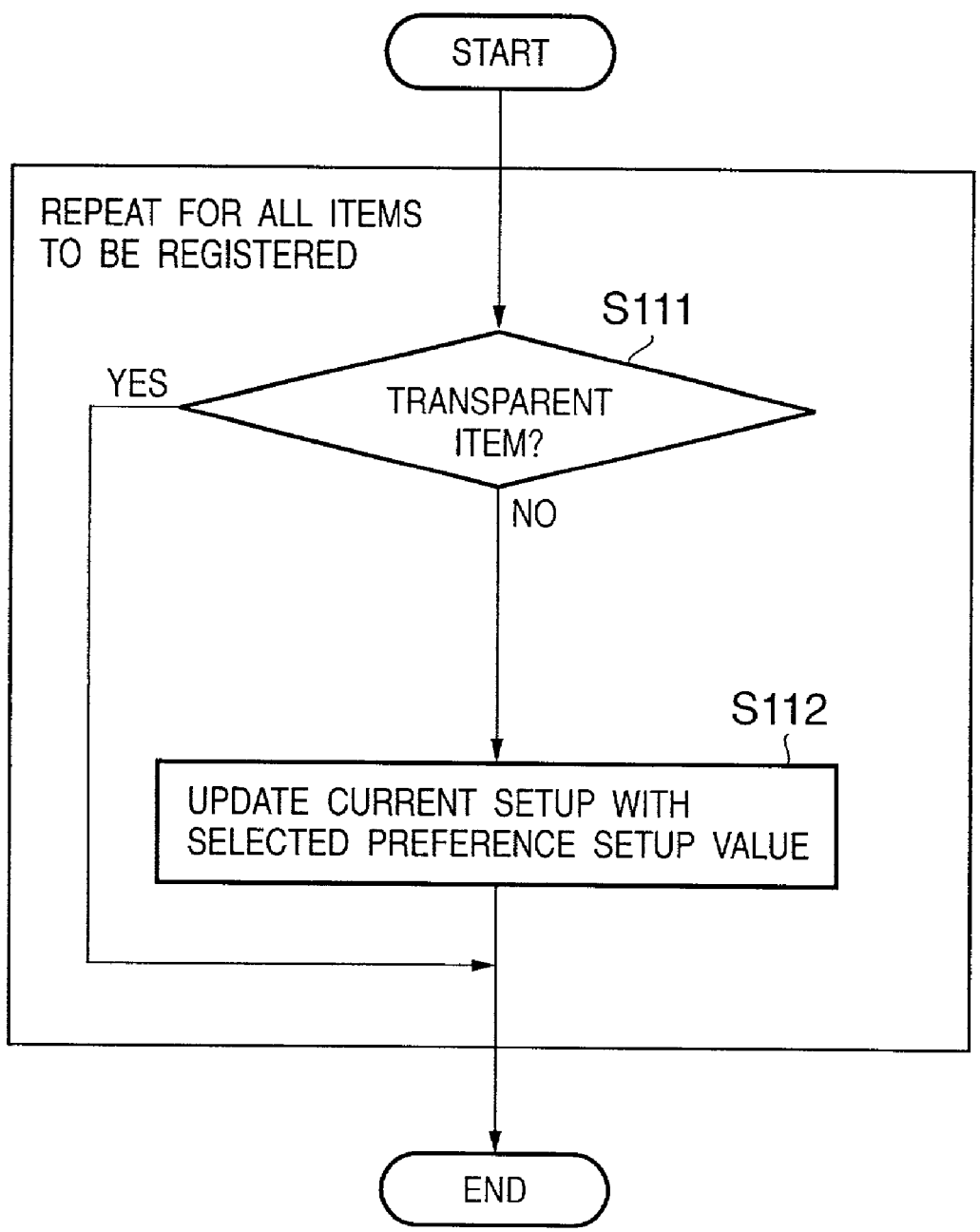
FIG. 9 is a flowchart showing the flow of preference selection processing in the computer system according to the embodiment of FIG. 1.

Note that in this modification, the selection change processing (corresponding to step S42 in FIG. 4) is the same as shown in FIG. 9. However, the difference is that at step S112, it is determined whether or not the item is a transparent item by referring to attributes of preferences instead of referring to the transparent item list.

In this manner, as transparent item(s) can be selected by each set of preferences, the user can perform setting with a higher degree of freedom by changing only a particular portion of the items, or by utilizing a combination of items.

Other Embodiment

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a program product (including a storage medium holding program code, a compressed program downloaded from a server and the like) holding software program code for realizing the aforesaid functions of the above-described embodiment to a system or an apparatus, and executing the program code by a computer (e.g., CPU or MPU) of the system or apparatus. In this case, the program code itself held in the program product realizes the functions according to the embodiment, and the program product or storage medium constitutes the invention. Furthermore, besides aforesaid functions according to the above embodiment being realized by executing the program code by the computer, the present invention includes a case where an OS (operating system) or the like working on the computer performs a part or entire actual processing in accordance with designations of the program code and realizes the functions according to the above embodiment.

Furthermore, the present invention also includes a case where, after the program code is written in a function expansion card which is inserted into the computer or in a memory provided in a function expansion unit which is connected to the computer, a CPU or the like contained in the function expansion card or unit performs a part or entire actual processing in accordance with designations of the program code and realizes the functions of the above embodiment.

In a case where the present invention is applied to the aforesaid storage medium, program code corresponding to the above-described flowcharts (shown in FIGS. 4, 6, 8 and 9) is stored in the storage medium as shown in FIG. 13.

As described above, the present invention provides a storage medium, an information processing apparatus and an information processing method enabling a user to perform parameter setting with high degree of freedom.

As many apparently widely different embodiments of the present invention can be made without departing from the spirit and scope thereof, it is to be understood that the invention is not limited to the specific embodiments thereof except as defined in the appended claims.

What is claimed is:

1. A storage medium holding a printer driver program, executed by a computer, including a printer driver for setting for plural setting items for execution of printing, said program comprising:
    code of a selection process for selecting a parameter group from plural parameter groups registered in an information processing apparatus, each parameter group comprising plural setting items;
    code of an edition process for editing the parameter group selected in said selection process and for setting whether or not particular setting items to be set by an application are prior to setting items corresponding to the particular setting items in the selected parameter group; and
    code of a reflection process for reflecting as parameters of the print driver, all of the setting items in the parameter group selected in said selection process in a case where it is not set in said edition process that the particular setting items to be set by the application are prior to the corresponding setting items in the selected parameter group, and for reflecting, as parameters of the print driver, setting items not corresponding to the particular setting items in the parameter group selected in said selection process in a case where it is set in said edition process that the particular setting items to be set by the application are prior to the corresponding setting items in the selected parameter group.

2. The storage medium according to claim 1, wherein said program further comprises code of a registration process for registering parameter groups for the plural setting items.

3. The storage medium according to claim 2, wherein, in said registration process, the subset is also registered with linkage with the parameter groups.

4. The storage medium according to claim 1, further including a data list representing the setting items that are in the subset.

5. The storage medium according to claim 4, wherein said program further includes code of a process for selecting setting items to be included in the subset, and generating the data list.

6. The storage medium according to claim 4, wherein the data list is prepared with linkage respectively with the plural parameter groups.

7. The storage medium according to claim 1, wherein each process is performed based on a user's input with regard to a dialog displayed on a display screen of the computer.

8. An information processing apparatus for executing said processes of said program held in the storage medium in claim 1.

9. An information processing apparatus having a printer driver for setting for plural items, comprising:
    selection means for selecting a parameter group from plural parameter groups registered in said information processing apparatus, each parameter group comprising plural setting items;
    edition means for editing the parameter group selected by said selection means and for setting whether or not particular setting items to be set by an application are prior to setting items corresponding to the particular setting items in the selected parameter group; and
    setting items reflection means for reflecting, as parameters of the print driver, all of the setting items in the parameter group selected by said selection means in a case where it is not set by said edition means that the particular setting items to be set by the application are prior to the corresponding setting items in the selected parameter group, and for reflecting, as parameters of the print driver, setting items not corresponding to the particular setting items in the parameter group selected by said selection means in a case where it is set by said edition means that the particular setting items to be set by the application are prior to the corresponding setting items in the selected parameter group.

10. An information processing method using a printer driver for setting for plural items, comprising:
    a selection step of selecting a parameter group from plural parameter groups registered in said information processing apparatus, each parameter group comprising plural setting items;
    an edition step of editing the parameter group selected in said selection step and for setting whether or not particular setting items to be set by an application are prior to setting items corresponding to the particular setting items in the selected parameter group; and
    a reflection step for reflecting, as parameters of the print driver, all of the setting items in the parameter group selected in said selection step in a case where it is not set in said edition step that the particular setting items to be set by the application are prior to the corresponding setting items in the selected parameter group, and for reflecting, as parameters of the print driver, setting items not corresponding to the particular setting items in the parameter group selected in said selection step in a case where it is set in said edition step that the particular setting items to be set by the application are prior to the corresponding setting items in the selected parameter group.

* * * * *